United States Patent Office 3,639,299
Patented Feb. 1, 1972

3,639,299
NOVEL FLAME RETARDANT COMPOSITIONS
AND METHOD OF APPLYING
Kenneth R. MacDowall, Manhattan Beach, Calif., assignor to North American Rockwell Corporation
No Drawing. Filed Mar. 5, 1968, Ser. No. 710,649
Int. Cl. B01j 13/02; C08j 1/14
U.S. Cl. 260—2.5 FP 8 Claims

ABSTRACT OF THE DISCLOSURE

A flame retardant composition wherein said composition comprises an essentially flame resistant binder having intimately and homogeneously proportioned therein at least two inorganic flame retardants; at least one organic flame retardant; at least one non-resinous carbonific agent; at least one organic, nitrogenous intumescent adjutant; at least one spumific agent and a neutralizing and halogen absorbing reagent and wherein said ingredients are interdependent and coacting to produce the desired flame resistant composition of matter.

The invention described herein was made in the performance of work under a NASA contract and is subject to the provisions of Section 305 of the National Aeronautics and Space Act of 1958, Public Law 85–268 (72 Stat. 435; 42 USC 2457).

BACKGROUND OF THE INVENTION

The present invention relates to a novel and unobvious fire retardant composition of matter. More particularly, the subject invention pertains to flame retardant compositions suitable for the protection of flammable substrates against burning in an air or pure oxygen atmosphere. Specifically, the present invention is concerned with an essentially non-toxic, essentially non-gaseous improved fire retardant containing inorganic and organic fire retardants, carbonifics, intumescents, spumifics, neutralizers and halogen absorbers intimately and homogeneously blended in a resinous binder and suitable for use either in an air atmosphere or in an essentially pure oxygen atmosphere where non-combustible applications are highly desired.

Fire retardant coating and paint compositions are well known in the subject art for protecting flammable substrates from burning in ordinary air. These compositions generally comprise a mixture of a halogenated hydrocarbon, such as chlorinated paraffin or biphenyl, and inorganic flame retardants such as oxides or sulfides of arsenic, antimony, boron, bismuth, and tin, sometimes together with intumescent agents which cause a coating film to swell upon heating, and thereby forming a non-combustible, insulating barrier over a given surface under normal atmospheric conditions. These retardants are often combined with a large amount of various resins which serve as binders for facilitating application of the fire retardant compositions onto predetermined surfaces. Usually, the presently available fireproof paints and coatings will contain about 35–75 weight percent of a resin binder.

The flame retardant compositions now available have several severe and highly undesirable drawbacks. For example, particularly in pure oxygen atmospheres as often required in chemical plants, oil refineries, and the like, many compositions which are fireproof in ordinary air, such as polytetrafluoro ethylene, will not provide protection in a more strongly flame-supporting pure oxygen atmosphere. Also, many materials which burn only slowly in air will rapidly ignite and burn violently in pure oxygen. Furthermore, a number of the prior art flame retardant compositions which work upon known intumescent principles may release noxious gases which, while protecting the substrate, are extremely hazardous especially in a confined environment.

Therefore, the principal object of the present invention is to provide a novel and unobvious fire retardant composition of matter which will effectively protect substrates under both atmospheric and highly combustible conditions.

Another object of the subject invention is to provide an improved flame retardant composition which will be effective even in a pure oxygen atmosphere to protect substrates from burning and which composition will not release in any significant amount toxic gases.

Still another object of the invention is to provide a flame resistant decorative composition which may be readily formulated and easily applied onto a large number of different predetermined combustible substrates.

Yet a further object of the invention is to make available to the art an improved fire resistant composition which is non-combustible in an air and in an essentially pure oxygen environment, and which composition will protect combustible surfaces under like conditions against flame to avoid their ignition.

Yet still a further object of the invention is to fabricate a fire retardant composition consisting essentially of a flame resistant, synthetic resin binder, inorganic and organic flame retardants, a carbonific agent, a nitrogenous based intumescent adjutant, a foaming spumific and a neutralizing and halogen absorber for employment where substrates are subjected to different combustible atmospheres.

Other objects, features and advantages of the present invention will become apparent to those skilled in the art from the following detailed description and the appended claims.

BRIEF DESCRIPTION OF THE INVENTION

In attaining the objects and advantages of the invention, it has now been unexpectedly found that a novel fireproofing composition of matter can be manufactured comprising a carefully proportioned, interdependent, coacting, multi-component composition having a relatively low percentage, usually about 19 to about 25 percent, of an organic resinous binder which is heavily loaded with flame retardants and other flame resistant or flame extinguishing agents. The flame retardant composition generally includes at least two different inorganic compounds, one, an alkaline earth borate and the other, antimony trioxide. Additionally, organic flame retardants which are incorporated into the composition are halogenated hydrocarbons which are stable up to relatively high temperatures. Also, an alkaline earth carbonate, which performs the dual function of stabilizer and halogen absorber for the halogenated hydrocarbon, is compounded into the composition. The composition further contains a mixture of three chemically different intumescent agents. The intumescent agents usually comprise a polyhydric compound which acts as a carbonific agent, an organic nitrogenous compound which is an intumescent adjutant or aid, and an alkaline phosphate which functions as a spumific or foaming agent. For decorative and aesthetic coloring, non-toxic and essentially flame resistant pigments may be added to the composition. An additional aspect of the invention resides in incorporating glass microballoons into the composition, which glass spheres offer additional thermal insulation to protect the substrates. The flame retardant composition is applied onto a substrate by conventional techniques. The binders employed are usually halogenated and they generally possess some flame resistance. A particular example of the presently preferred compositional ranges for the inventive fire retardant composition is set forth immediately below in Table I.

TABLE 1

| Ingredients: | Percent by weight |
| --- | --- |
| Inorganic flame retardants— | |
| Alkaline earth borates | 5–40 |
| Antimony trioxide | 2–10 |
| Organic flame retardants— | |
| Halogenated hydrocarbon | 5–20 |
| Intumescents— | |
| Spumific | 5–35 |
| Carbonifics | 1–8 |
| Intumescent aid | 1–8 |
| Stabilizer and gas absorber— | |
| Alkaline earth carbonate | 2–10 |
| Pigments | 0–3 |
| Glass microballoons | 0–35 |
| Organic resinous binder | 19–60 |

The coatings of the foregoing general character are readily formulated and easily applied onto a wide variety of substrates and they apparently will not yield any significant amounts of toxic decomposition products in the presence of flames. The instant fire retardant compositions have in laboratory tests protected different substrate materials such as polyurethane, melamine and nylon plastics from burning in an essentially pure oxygen atmosphere.

SUMMARY OF THE INVENTION

Briefly, the invention pertains to a fire resistant composition consisting essentially of 19 to 60 percent by weight of an elastomeric, halogenated copolymer of vinylidene fluoride and a halogenated lower aliphatic selected from the group consisting of vinyl chloride, hexafluoropropylene and chlorotrifluoroethylene, from 5 to 40 percent by weight of an inorganic alkaline borate flame retardant, from 2 to 10 percent of weight of antimony trioxide, from 5 to 20 percent by weight of an organic flame retardant hydrocarbon, from 5 to 35 percent by weight of a spumific agent, from 1 to 8 percent by weight of a carbonific, from 1 to 8 percent by weight of a nitrogenous intumescent aid, and from 2 to 10 percent by weight of an alkaline earth carbonate and wherein said reagents are intimately and homogeneously dispersed within the halogenated elastomer to produce the flame retardant. The composition may also have small glass spheroids and decorative pigments.

DESCRIPTION OF PREFERRED EMBODIMENTS

The composition of the present flame retardant coating will now be described in more detail. In the composition, two inorganic flame retardants are used, an alkaline earth borate and a relatively smaller concentration, in relation to the borate, of antimony trioxide. The oxygen-containing salts of boron and antimony are preferred to avoid any possible presence of toxic decomposition products. The borate, as well as all the other compounds in the present fire retardant composition, should be relatively water-insoluble in order to avoid softening of the coating in a damp or high humidity atmosphere. Accordingly, alkali metal borates, which are relatively water soluble, are not particularly suitable for the instant composition, whereas alkaline earth borates, such as zinc borate, are more satisfactory. The borates used herein appear to function as a fluxing type material, that is, upon melting they form an impenetrable oxygen barrier to the coated substrate. The now preferred antimony compound is antimony trioxide and the optimum ratio between the alkaline earth borate and the antimony trioxide is about 5 to 1, by weight.

The intumescent qualities of the present compositions are effectively obtained by the utilization of three chemically different reagents. Generally, these three reagents are a carbonific, an intumescing aid and a spumific. More specifically, the reagents are a polyhydric alcohol, an organic nitrogenous compound and an alkaline phosphate. These three reagents, on being subjected to a burning action, combine to form an expanded carbon type structure which will not further burn or release undesirable gaseous decomposition products. The interdependence and coaction of these three reagents thereby provides a highly desirable insulating surface for the coated substrate.

The carbonific reagents employed herein are the commercially available polyhydric type compound, and they are the carbon source for the intumescent activity of the composition. The polyhydric compound, usually a polyhydric alcohol, intimately coacts with the spumific and intumescing agents during its decomposition by heat to form a puffed-up layer of carbon foam which is resistant to combustion. Generally satisfactory polyhydric alcohols for the purpose of the invention are the alcohols of various carbonaceous organic sugars, hexitols such as mannitol, penitols such as arabitol, and tetritols such as polyaerythritols. The compositions can contain one or a mixture of these reagents. Because of suitability, availability and cost, pentaerythritol is presently preferred.

Exemplary of the intumescent aid utilized herein are the water soluble, organic nitrogen compounds, which on heating release a gas that serves to increase cell puff, cell uniformity and assist the spumific agent in the foaming action. Especially satisfactory are organic amines such as urea, dimethylurea, cyanimide, guanylurea, dicyanimide, guanylurea, dicyanimide and the like.

The spumific reagent used within the mode and manner of the invention is preferably a phosphate compound, and its foaming action serves to swell the coating. The spumific is preferably alkaline in order to avoid polymerization of the organic binder. Also, since the present coatings may be stored after formulation for long periods prior to their use, acidic type spumifics should be avoided because the binders utilized herein are usually further polymerized by acidic type reagents. The spumific may be an inorganic or organic type compound. Illustrative of inorganic spumifics are the alkaline earth phosphates such as calcium phosphate, monoammonium phosphate, diammonium phosphate and the like. Illustrative of organic phosphates that may also be employed are trisdichloropropyl phosphate and tri-beta-chloroethyl phosphate. Other suitable phosphates are the commercially available phosphates sold under the registered trademarks Phos-Check®, an ammonium polyphosphate and Phosgard®, and organophorous polymer.

While the intumescing, carbonific, polyhydric alcohol agent, the intumescent, organic nitrogen aid, and the spumific alkaline phosphate may satisfactorily be used in varying proportions within the overall fire retardant composition, it has been found that the majority of the flame resistant composition should be the carbonific agent. Preferably, the optimum proportions by weight for the carbonific, intumescent and spumific are about 70–15–15.

A halogenated hydrocarbon, preferably a heavily chlorinated, for example, 45–75 percent chlorine by weight, hydrocarbon which does not polymerize and which is non-plasticizing, is also utilized in the present composition as a flame retardant. For the present purposes the hydrocarbon should begin to decompose in the region of about 600° F.; because, decomposition at a lower temperature would be undesirable for the protection of such items as electrical components which can reach temperatures of at least about 350° F. without damage or fire. For this and other reasons, chlorinated lower paraffins and biphenyl, which melt in the region of 300° F., would be unsuitable. On the other hand, if the hydrocarbon decomposes at too high a temperature, for example, above about 800° F., there may be substrate damage before it can react as a retardant. Halogenated rubbers, higher polyphenyls, fused ring compounds, and higher paraffins which meet the foregoing temperature requirements may be suitably used. Particularly suitable hydrocarbons are the relatively higher melting alkanes; paraffins, such as octanes, nonanes, decanes; and the cyclic alkanes, such as cyclodecane. One example of a preferred cyclodecane is perchloropentacyclodecane, $C_{10}Cl_{12}$, M.P. 662° F. The chlorinated cyclodecanes are nonplasticizing, thereby avoiding a soft or mushy coating, and are stable in the presence of strong oxidizing and reducing agents. Any trace amounts of chlorine liberated would be absorbed by the calcium carbonate, which thus serves as a stabilizer for the chlorinated organic. Other satisfactory halogenated organic compounds are chlorinated paraffins, tetrachloro - phthalic anhydride, tris(beta - chloroethyl) phosphate and the like.

The halogenated organic compound appears to operate as a flame retardant on a similar mechanism as some of the aforesaid compounds, in that upon decomposition, noncombustible gases such as HCl, HBr, $NH_3$, $H_2O$, and $CO_2$ are produced, which gases dilute or smother the flammable gases so that flame cannot be supported. Additionally, the just produced halide gases such as HCl which is released upon decomposition further react with the alkaline earth carbonate to give the flame suppressing $CO_2$ and $H_2O$.

An alkaline earth carbonate, exemplified by $CaCO_3$ or $MgCO_3$, is utilized in this invention as a source of $CO_2$ and $H_2O$ upon reaction with HCl or HBr of the halogenated organic compound. The carbonate serves to stabilize the halogenated organic compound by functioning as an acid acceptor. Thus, these two ingredients of the present composition are essentially interdependent and coacting. Any trace amount of halogens liberated during storage or otherwise by the halogenated hydrocarbon are absorbed by the alkaline earth carbonate.

For decorative or appearance purposes, a few parts of ordinary paint pigments, such as cobalt blue or titanium dioxide, may compatibly be added to the coating. Potentially toxic pigments, such as compounds of arsenic or lead, with high vapor pressures could be used for coloring but they are not generally preferred.

The flame retardant and insulating properties of the foregoing composition may optionally be further enhanced by incorporating therein about 5 to 35 weight percent glass microballoons. The term "glass microballoon" as used herein refers to tiny, for example, about 100 micron size, hollow glass spheroids, containing a major proportion of an alkali metal silicate. Representative glass microballoons are described in U.S. Pats. 2,978,339; 2,978,340; and 3,030,215. When the glass microballoons are included in the fire resistant composition they impart additional heat insulating qualities to the present flame retardant composition.

The foregoing components are incorporated into a polymer binder for facilitating application onto a substrate. Especially satisfactory are elastomeric halogenated polymers, notably the fluorinated vinylidene polymers, which are usually saturated and contain more than 50 weight percent fluorine. Representative of commercially available halogenated elastomeric polymers are the copolymers of vinylidene fluoride and hexafluoropropylene, the copolymer of chlorotrifluoroethylene and vinylidene fluoride and the like. These and other related gum rubbers, which are not generally known as coating binders, are available under the registered trademarks Fluorel® 2140, 2141 and 2146; Viton® A, B and AHB; and Kel-F®.

The indicated fluorinated vinylidene polymers, in addition to their binder function, display a certain degree of flame resistance themselves. In contrast with ordinary flame retardant paints which may contain approximately 35–75 percent polymer vehicle, satisfactory results, in terms of coverage, adherence, and craze, flake and scratch resistance, may be obtained in the present case with a minimum of about 19 weight percent polymer binder, about 25 weight percent being preferred. The practical benefit of this is to load the paint with the more highly flame resistant components described supra. The adherence properties of the present composition are such that multiple coats of the fire retardant may be applied, as desired or required to a given substrate. Each coat utilized is about 3 to 5 mils thick depending on the solvent system. When glass microballoons are incorporated into the flame resistant compositions the coatings are about 12 to 15 mils thick. For optimum fire protection in pure oxygen, a coating of about 60–90 mils, depending on substrate, can be rapidly applied by spraying with only about 10 to 15 minutes required for drying between successive coats. For optimum fire protection in an air atmosphere a coating of about 5 to 10 mils usually produces the desired results.

The present flame retardant composition is applied to a substrate surface in an organic solution. It is readily soluble in the common organic solvents and, therefore, any relatively low molecular weight organic solvent may be used. Among these are the relatively low molecular weight alcohols, such as butyl alcohol; ketones, such as ethyl and methyl ketone; lower esters; toluene and the like. A step solvent system having a controlled evaporation rate is preferred, that is, one which will keep the top of the film open until all of the solvent has evaporated, thereby permitting the coating to completely dry. A solvent mixture having components with different evaporation rates is accordingly employed, which comprises a relatively greater amount of the solvent with the fastest evaporation rate and progressively smaller amounts of solvents with slower evaporation rates. As example of one suitable step solvent system is a mixture of methylethyl ketone, having the fastest evaporation rate; methylisobutyl ketone; and amylacetate, having the slowest evaporation rate, in a weight ratio of about 4 to 2 to 1, respectively. Approximately as much or a slightly greater amount of solvent, in relation to the coating formulation, is utilized. The solvent concentration will vary with the method employed for the application of the coating onto the base material, a thinner solution being utilized for spraying than for brushing. When spraying a lighter, faster evaporating solvent is preferred rather than a step solvent system. Since a considerable amount of solvent is lost due to atomization and evaporation in spraying, a proportionally larger amount, usually 20 to 25 percent, is employed.

The coating composition is formulated by thoroughly and intimately mixing the constituents and grinding in a ball or pebble mill until a fine grind is obtained, for example, about 48 to 72 hours. The composition is preferably milled wet, including the resin binder in about a 20 percent solution of the solvent system. A small portion of the solvent is retained for cleaning the mill out since about 20–30 percent of the coating composition will remain in the mill. Following milling, the homogeneous composition is then ready for application to the substrate surface by any conventional method, such as spraying, brushing, dipping, or the like.

The range of the components in the present flame retardant coating may suitably vary over a reasonable range while giving satisfactory results. In part, the range will vary with the mission contemplated for the coating in terms of temperature, environment, substrate properties, and the like. Furthermore, the amount of the halogenated hydrocarbon organic compound and the alkaline earth carbonate are balanced; and, if the organic is increased in concentration so is the stabilizing carbonate. Likewise, if the concentration of the flame retardant borate is decreased, the concentration of the intumescent agents should be increased. Suitable concentration ranges were set forth in Table 1 supra. In Table 2, immediately below, is set forth a composition for a typical fire retardant formulated within the mode and manner of the present invention.

TABLE 2

| Ingredients: | Percent by weight |
|---|---|
| Inorganic flame retardants— | |
| Zinc borate | 25.00 |
| Antimony trioxide | 5.00 |
| Intumescent agents— | |
| Ammonium phosphate (monobasic) | 18.00 |
| Pentaerythriol | 4.25 |
| Dicyandiamide | 4.25 |
| Stabilizer— | |
| Calcium carbonate | 6.00 |
| Halogenated organic compound— | |
| Perchloroheptacyclodecane | 10.00 |
| Binder— | |
| Saturated fluorinated vinylidene copolymer having over 50% fluorine | 25.00 |
| Pigment— | |
| Cobalt blue | 2.50 |

The above discussion and the following examples are illustrative of the present invention and are not to be construed as limiting the spirit and scope of the invention in any manner, as these and other variations will be readily apparent to those versed in the subject art.

EXAMPLE I

A fire retardant composition was prepared according to the spirit of the present invention by intimately blending 25 weight percent zinc borate, 5 weight percent antimony trioxide, 18 weight percent monobasic ammonium phosphate, 4.25 weight percent pentaerythritol, 4.25 weight percent dicyandiamide, 6 weight percent calcium carbonate, 10 weight percent perchloroheptacyclodecane, 25 weight percent of a commercially available polymer Fluorel 2140 which is a fully saturated copolymer of vinylidene fluoride and hexafluoropropylene having more than 60 percent fluorine by weight, a specific gravity of 1.85, a Shore A hardness of 40 and a Mooney viscosity at 212° F. of 135, and 2.5 weight percent of cobalt blue pigment, in a 20 weight percent solvent system consisting of methylethyl ketone, methylisobutyl ketone and amyl acetate in a ratio of 4 to 2 to 1 respectively. The ingredients were thoroughly blended by ball milling in a conventional mill having $Al_2O_3$ milling balls until a smooth homogeneous composition was produced. The desired composition was obtained after about 72 hours of milling under normal atmospheric conditions at room temperature.

The new coating composition was next tested for its fire resistant properties. The test consists of first brushing the coating onto a 3½ by ½ inch cylinder made of flammable silicon rubber. After drying, the coated test specimen was placed in a pressure vessel in such a manner that the center of the test specimen was in direct contact with a heating coil of Nichrome wire on which had been placed a 2 inch square piece of tissue paper to initiate fire against the coating composition. Then, the vessel was pressurized to 16.5 p.s.i. with pure oxygen, evacuated and repressurized to 16.5 p.s.i. of pure oxygen. An electrical current of 5 amps was applied to the Nichrome heating coil to cause the paper to ignite and burn. The current was applied for about 30 seconds. The paper burned with a flame for about 5 seconds until it was consumed after which the flame expired. Close examination of the coated silicon rubber test specimen revealed only the presence of carbon produced from the paper decomposition upon the coating. The charred area did not extend beyond the heating coil, that is, there was no propagation. There was no damage to the coating itself or to the silicone rubber substrate.

EXAMPLE II

The fire retardant coating prepared in Example I was next subject to an internal fire resistant test. The internal test consists in first burying the heating coil in the coating as applied onto a room temperature, vulcanized highly flammable silicon rubber substrate, and then electrically energizing the coil with a current of 5 amps for 30 seconds to produce intense heat within the coating and in immediate contact with the coated substrate. The internal test did not upon close examination evidence any ignition of the coating or the protected substrate.

EXAMPLE III

Following the procedure set forth in Example I, immediately above, a coating composition was prepared that included glass microballoons. The coating had the following composition wherein the ingredients are in weight percent: zinc borate, 19.3; antimony trioxide, 3.8; ammonium phosphate monobasic, 13.5; pentaerythriol, 2.9; dicyandiamide, 2.8; calcium carbonate, 4.8; perchloroheptacyclodecane, 19.3; glass microballoons, 24; fluorinated copolymer of vinylidene fluoride and hexafluoropropylene, 19.3; and coloring cobalt pigment, 2. A mixed solvent system was used for this fire resistant composition. The solvent consists of 4 parts by weight of methylethyl ketone, 2 parts by weight of methylisobutyl ketone and 1 part by weight of amyl acetate. 110 grams of the mixed solvent were employed for compounding the composition.

After application of the coating to a silicone elastomer substrate, an ignition test was preformed in pure oxygen according to the test procedure of Example 1. Examination showed that the silicone elastomer did not ignite, that is, the fire resistant coating served the same protective effect. The coating was also tested by the internal coil test of Example 2 and like results were attained.

Two compositions, one consisting of 100 grams of a fully saturated copolymer of vinylidene fluoride and hexafluoropropylene with more than 60 percent fluorine, 15 grams of dicyandiamide, 70 grams of monoammonium phosphate, 15 grams of pentaerythriol and 10 grams of chlorowax, and the other composition consisting essentially of 100 grams of a fully saturated halofluorocarbon copolymer of chlorotrifluoroethylene and vinylidene fluoride containing more than 50 percent fluorine by weight, 70 grams of monoammonium phosphate, 15 grams of dicyandiamide, 15 grams of pentaerythriol and 10 grams of chlorowax were prepared according to the procedures set forth in Example I. These compositions were tested for the fire resistance in both air and pure oxygen atmospheres. While the compositions did not burn in air, they did burn in the oxygen environment when tested in accordance with the procedure described in Example I.

The fire retardant compositions of the invention can be used for diverse military, scientific and commercial applications. For example, they can be used to provide flameproofing properties or fire insulation for electrical applications such as switch plates, fuse boxes, conductors, bus bars, various sorts of wires and the like. Additional uses for the compositions are housing for motors as employed in freezers, washers, vacuum machines and the like. Because the present compositions are further characterized by their low gasing properties, they can be used in confined quarters.

The foregoing discussions and examples are illustrative of the scope of the present invention. It is apparent that changes in formulation of the components of the present coating composition may be made in the manner indicated by the present teachings, as required for particular coating applications and environments. Such variations should

I claim:

1. A fire retardant composition of matter wherein said composition comprises from 19 to 60 percent by weight of a synthetic, elastomeric, halogenated copolymer of vinylidene fluoride and a halogenated lower aliphatic selected from the group consisting of hexafluoropropylene and chlorotrifluoroethylene and mixtures thereof, from 5 to 40 percent by weight of an inorganic alkaline earth borate flame retardant, from 2 to 10 percent by weight of antimony trioxide flame retardant, from 5 to 20 percent by weight of a flame retardant organic halogenated hydrocarbon, from 5 to 35 percent by weight of a spumific foaming agent selected from the group consisting of calcium phosphate, monoammonium phosphate, diammonium phosphate, ammonium polyphosphate, tris-(dichloropropyl) phosphate and tris-(beta-chloroethyl) phosphate and mixtures thereof, from 1 to 8 percent by weight of a polyhydric carbonific selected from the group consisting of hexitols, penitols and tetritols and mixtures thereof, from 1 to 8 percent by weight of an organic, nitrogenous intumescent selected from the group consisting of urea, dimethylurea, cyanimide, guanylurea and dicyanimide and mixtures thereof, and from 2 to 10 percent by weight of an alkaline earth stabilizer selected from the group consisting of calcium carbonate and magnesium carbonate and mixtures thereof, and wherein said reagents are intimately and homogeneously dispersed within said halogenated elastomer to produce the fire retardant composition.

2. A fire retardant composition according to claim 1 wherein the alkaline earth borate is zinc borate and wherein the ratio of said zinc borate to the antimony oxide is 5 to 1.

3. A fire retardant composition according to claim 2 wherein the tetritol is pentaerythritol.

4. A fire retardant composition according to claim 1 wherein the organic halogenated hydrocarbon contains from 45 to 75 percent by weight halogen and wherein said hydrocarbon is a member selected from the group consisting essentially of halogenated octanes, nonanes, decanes and cycloalkanes and mixtures thereof.

5. A fire retardant composition according to claim 4 wherein said cycloalkane is perchloropentacyclodecane.

6. A fire retardant composition according to claim 4 wherein said cycloalkane is perchloroheptacyclodecane.

7. A fire retardant composition according to claim 1 wherein said composition contains from 5 to 35 percent by weight of glass microballoons.

8. A method for protecting a flammable substrate against flame wherein the method comprises applying to said substrate a flame retardant coating composition consisting of 19 to 60 percent by weight of a synthetic, elastomeric, halogenated copolymer of vinylidene fluoride and a halogenated lower aliphatic selected from the group consisting of hexofluoropropylene and chlorotrifluoroethylene and mixtures thereof, from 5 to 40 percent by weight of an inorganic alkaline earth borate flame retardant, from 2 to 10 percent by weight of antimony trioxide, from 5 to 20 percent of a flame retardant organic halogenated hydrocarbon, from 5 to 35 percent by weight of a spumific foaming agent selected from the group consisting of calcium phosphate, monoammonium phosphate, diammonium phosphate, ammonium polyphosphate, tris-(dichloropropyl) phosphate and tris-(beta-chloroethyl) phosphate and mixtures thereof, from 1 to 8 percent by weight of a polyhydric carbonific selected from the group consisting of hexitols, penitols and tetritols and mixtures thereof, from 1 to 8 percent by weight of an organic, nitrogenous intumescent selected from the group consisting of urea, dimethylurea, cyanimide, guanylurea and dicyanimide and mixtures thereof, and from 2 to 10 percent of an alkaline earth stabilizer selected from the group consisting of calcium carbonate and magnesium carbonate and mixtures thereof, and wherein said coating is about 5 to about 90 mils thick to protect said flammable substrate.

References Cited

UNITED STATES PATENTS

| | | | |
|---|---|---|---|
| 2,158,281 | 5/1939 | Ford et al. | 260—FP Dig |
| 2,452,054 | 10/1948 | Jones et al. | 260—FP Dig |
| 2,468,054 | 4/1949 | Ford | 260—FP Dig |
| 2,684,953 | 7/1954 | Stilbert, Jr. et al. | 260—FP Dig |
| 2,754,217 | 7/1956 | Allen et al. | 260—FP Dig |
| 2,912,394 | 11/1959 | Stilbert, Jr. et al. | 260—2.5 FP |
| 2,962,464 | 11/1960 | Field | 260—FP Dig |
| 3,037,951 | 6/1962 | Basto et al. | 260—2.5 FP |
| 3,113,118 | 12/1963 | Canterino et al. | 260—FP Dig |
| 3,317,455 | 5/1967 | Blome et al. | 260—2.5 FP |

MURRAY TILLMAN, Primary Examiner

M. FOELAK, Assistant Examiner

U.S. Cl. X.R.

260—2.5 X, 17.4 SG, 31.2 R, 32.8 R, 33.4 F, 33.6 F, 41 A, 41 B, 45.75 K, 45.75 R, 45.85, 45.9 R, DIG. 24